United States Patent
Pardo (10) Patent No.: US 10,746,466 B2
(45) Date of Patent: Aug. 18, 2020

(54) METHOD AND FACILITY FOR THERMALLY DRYING PASTY PRODUCTS

(71) Applicant: SUEZ INTERNATIONAL, Paris la Defense (FR)

(72) Inventor: Pierre Emmanuel Pardo, Orsay (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 538 days.

(21) Appl. No.: 15/501,977

(22) PCT Filed: Aug. 3, 2015

(86) PCT No.: PCT/IB2015/055887
§ 371 (c)(1),
(2) Date: Feb. 6, 2017

(87) PCT Pub. No.: WO2016/020829
PCT Pub. Date: Feb. 11, 2016

(65) Prior Publication Data
US 2017/0227288 A1     Aug. 10, 2017

(30) Foreign Application Priority Data
Aug. 8, 2014 (FR) ..................... 14 57707

(51) Int. Cl.
*F26B 23/00* (2006.01)
*F26B 3/04* (2006.01)
(Continued)

(52) U.S. Cl.
CPC .............. *F26B 23/005* (2013.01); *F26B 3/04* (2013.01); *F26B 17/023* (2013.01);
(Continued)

(58) Field of Classification Search
CPC .. F26B 17/023; F26B 2200/18; F26B 23/002; F26B 23/005; F26B 23/008; F26B 3/04; Y02B 30/52; Y02P 70/405
See application file for complete search history.

(56) References Cited

U.S. PATENT DOCUMENTS 3,066,030 A * 11/1962 Eolkin ...................... A23L 3/52
426/329
4,472,887 A * 9/1984 Avedian ................. A23N 12/08
34/212
(Continued)

FOREIGN PATENT DOCUMENTS

CN          103749670        4/2014
DE          505017 C  *  8/1930  ............. F26B 17/04
(Continued)

OTHER PUBLICATIONS

International Search Report, dated Oct. 21, 2015, from corresponding PCT Application.

*Primary Examiner* — Jorge A Pereiro
*Assistant Examiner* — Logan P Jones
(74) *Attorney, Agent, or Firm* — Young & Thompson (57) ABSTRACT

Disclosed is a method for thermally drying pasty products, in particular wastewater sludge, and a belt dryer implementing such a method. The principle consists of partitioning the drying operations and using, for each of the successive operations, a different quality of air: (i) hot air for "searing" the sludge, (ii) low temperature air, then (iii) cold air for quenching the sludge before the extraction of same. Also proposed are loops of air supply circuits making it possible to optimize the energy consumption of the dryer by reusing energy produced within these circuits. Moreover, the loops make it possible to recover unavoidable low temperature energy or cheap energy, further optimising the consumption of the dryer.

11 Claims, 2 Drawing Sheets

(51) Int. Cl.
*F26B 17/02* (2006.01)
*F26B 17/04* (2006.01)

(52) U.S. Cl.
CPC .......... *F26B 23/002* (2013.01); *F26B 23/008* (2013.01); *F26B 2200/18* (2013.01); *Y02B 30/52* (2013.01); *Y02P 70/405* (2015.11)

(56) References Cited

U.S. PATENT DOCUMENTS

2002/0088137 A1* 7/2002 Savarese .................. F26B 3/28
                                                                  34/266
2012/0304488 A1   12/2012 Pardo

FOREIGN PATENT DOCUMENTS

| | | | | |
|---|---|---|---|---|
| DE | 2645835 A1 | * | 4/1978 | ........... A23B 7/0205 |
| DE | 3013703 A1 | * | 10/1981 | .............. F26B 21/06 |
| DE | 3013820 A1 | * | 10/1981 | ............ F25B 29/003 |
| DE | 198 25 597 A1 | | 12/1999 | |
| EP | 0079523 A1 | * | 5/1983 | .............. F26B 13/10 |
| EP | 0 781 741 A1 | | 7/1997 | |
| GB | 1530822 A | * | 11/1978 | ............... A23J 1/007 |
| GB | 2064099 A | * | 6/1981 | ........... B01D 53/265 |
| WO | 01/58815 A2 | | 8/2001 | |
| WO | 2004/046629 A1 | | 6/2004 | |
| WO | 2011/061715 A1 | | 5/2011 | |

\* cited by examiner

METHOD AND FACILITY FOR THERMALLY DRYING PASTY PRODUCTS

TECHNICAL FIELD

The present invention relates to the field of thermal drying of pasty products, for example though nonlimitingly, wastewater sludge from wastewater purification stations.

PRIOR ART

Wastewater sludge contains water and dry solids. The dryness of a sludge indicates its dry solids content. Typically, a sludge is said to be pasty when its dryness is comprised between 10 and 25%, it is said to be solid when its dryness is comprised between 25 and 85%, and it is said to be dry when its dryness is higher than 85%.

The drying of wastewater sludge, namely its conversion to dry sludge, is beneficial to realizing the potential therein. In particular, dried sludge does not ferment, which is good for the conditions of storage thereof, and can be spread on fields or burnt as fuel.

Several methods of thermal drying that allow the water contained in sludge to be evaporated are known from the prior art and use the following types of dryer:

- direct-contact dryers which dry by convection by bringing a hot fluid, typically a gas, directly into contact with sludge,
- indirect-contact dryers which dry by conduction by transmitting a drying heat to sludge via a wall that is heated via heat-transfer fluid, typically a gas or a liquid,
- hybrid dryers that employ the principles of direct-contact and indirect-contact dryers.

The main disadvantage of thermal drying is that implementation thereof involves a significant energy expenditure, leading to high operating costs. Typically, present-day dryers require, for the drying of wastewater sludge, energy representing approximately 900-1100 kWh/TWE (metric Tonne of Water Evaporated).

A very widely used type of direct-contact dryers is a belt-type dryer. Typically, a belt-type dryer comprises one or more conveyor belts onto which the sludge for drying is placed where it is subjected to a hot air flow applied parallel or perpendicular to its direction of travel. In general, the sludge is shaped beforehand using an extruder or a granulator in order to increase the exchange area.

Belt-type dryers are very robust and easy to operate. However, they have a number of disadvantages or limitations:

- in order to obtain a sludge of given dryness at the outlet of the dryer, the use of a low drying temperature entails the use of a large-sized dryer agitating a large quantity of air, leading to high electricity consumption,
- they are unable to prevent the risk of self-heating of the sludge because it is difficult for the temperature thereof at the outlet of the dryer to be brought back down below 30° C. given that the drying is performed by a flow of hot air.

Thus, it is an object of the invention to cool the sludge leaving the dryer so that this sludge can be stored without the risk of self-heating. This is because the self-heating of sludge is a very significant problem to any operator of a dryer. It is characterized by a significant rise in the temperature of the dried sludge during storage. It is possible for this rise to lead to the outbreak of a smoldering fire in the storage facility caused by self-ignition. This self-heating is the result of redox reactions which locally increase the temperature of the sludge. These redox reactions are accelerated by the temperature of the sludge. In addition, if the sludge is hot to start with, the final temperature achieved will be all the higher, and other combustion reactions may then ensue.

In belt-dryer methods, for example as described in document WO 2004/046629, it is known practice to admit ambient air at the end of the dryer, which may contribute to the cooling of the dried sludge. However, such cooling is uncontrolled because this admission of air is intended to compensate for air let out as a result of the purging of closed air loops and the creation of a droop of pressure within the dryer.

In order to limit the risk of self-heating as far as possible, the sludge absolutely must be cooled to a temperature typically lower than 35° C. and advantageously lower than 20° C. Whereas the temperature of the sludge in the dryer is typically higher than 50° C. or even 80° C. in drying steps. A small uncontrolled ambient temperature inlet of air is therefore not enough to control this dryer-outlet temperature effectively.

Another disadvantage with the known belt-type dryers is that the sludge may clog the conveyor belts when the incoming sludge is insufficiently dry and when the drying temperature used in the dryer is low.

Specifically, as it dries, a sludge goes through a plastic phase typically corresponding to a dryness of 45-55%, during which phase it becomes viscous and sticky.

To alleviate this disadvantage it is known practice to recirculate some of the sludge, either to prevent it from undergoing the plastic phase within a dryer, or to prepare the upstream sludge to make it compatible with the drying technology used.

However, recirculation is complicated and difficult to manage. Patent EP 0 781 741 B1 describes a thermal drying system that makes it possible to reduce the energy expenditure by reusing some of the energy used in a first drying stage. The first stage performs a pre-evaporation step. The second stage of this drying system consists of a belt-type dryer which reuses the energy from the first stage.

Such a drying system with pre-evaporation of the sludge makes it possible to obtain reduced consumptions of 700-800 kWh/TWE.

However, such a two-stage drying system has a number of disadvantages:

- it employs two dryers, respectively corresponding to the first stage and to the second stage of drying, and involves performing an operation of extruding the sludge between the two dryers, thereby requiring this room to be very well ventilated,
- given the dryness of the sludge leaving the pre-evaporation step, which is typically 40-60%, and the drying temperature required in the second stage, which is typically 120° C., to dry the sludge, the energy loops are not optimized.

The prior art also contains drying methods in which low-temperature heat energy, typically 50-90° C., of "residual" heat, which means to say residual heat that would otherwise go to waste from other devices (cogeneration motor, heat pump, boiler, etc) is used to heat a drying fluid of a thermal dryer.

However, the residual heat is generally not enough to completely dry the sludge in belt-type dryers. The energy consumption of the known drying methods that use residual energy is therefore still high.

It is an object of the present invention to propose a belt-type thermal drying method that optimizes energy consumption.

It is another object of the present invention to propose a belt-type thermal drying method that makes it possible to reduce the size of a belt-type dryer.

It is yet another object of the present invention to propose a belt-type thermal drying method that makes it possible to cool the sludge extensively before it is stored.

Thus, one object of the present invention is to propose a belt-type thermal drying method that allows the drying of sludge of low dryness.

It is another object of the present invention to propose a belt-type thermal drying method suited to any type of sludge, for example but nonlimitingly, poorly dewatered sludge.

It is yet another object of the present invention to propose a belt-type thermal drying method in which the drying of sludge is safer, notably in order to prevent the risks of self-heating.

SUMMARY OF THE INVENTION

This objective is achieved by using a method for the thermal drying of pasty products, particularly wastewater sludge, comprising:
- a step of depositing the pasty products on at least one conveyor belt, the depositing being performed in an inlet module,
- a step of moving the pasty products from the inlet module as far as an outlet module, the moving of the pasty products being performed by moving the at least one conveyor belt,
- a step of extracting the pasty products from the at least one conveyor belt, the extracting being performed in the outlet module, characterized in that it further comprises, during the moving step:
- a high-temperature drying step in which the pasty products are subjected to a high-temperature air flow within at least one high-temperature drying compartment, then
- a low-temperature drying step in which the pasty products are subjected to a low-temperature air flow within at least one low-temperature drying compartment, the low-temperature air flow having a lower temperature than the high-temperature air flow, the low-temperature drying step occurring after the high-temperature drying step.

Splitting the drying operation into several steps and using different air qualities within several compartments makes it possible, when the drying is performed by using a belt-type dryer:
- to supply the belt-type dryer with low-dryness sludge which could not have been dried in a belt-type dryer without performing a sludge-recirculation operation,
- to optimize the size of the belt-type dryer.

According to one advantageous feature, the high-temperature air is at a temperature higher than 100° C., preferably in the range from 100 to 200° C. when it arrives at the pasty products in the at least one high-temperature drying compartment.

According to another advantageous feature, the low-temperature air is at a temperature in the range from 20 to 90° C. when it arrives at the pasty products in the at least one low-temperature drying compartment.

According to yet another advantageous feature, the pasty products have a dryness of the order of 25-50%, preferably 25-35%, when they pass from the high-temperature drying step to the low-temperature drying step.

In one advantageous embodiment, the temperature of the low-temperature air is increased using heat recovered from the air flow leaving the at least one high-temperature drying compartment.

In particular, the recovered heat comprises heat of condensation of the moisture contained in the air flow leaving the at least one high-temperature drying compartment.

The low-temperature drying air can also be heated using residual heat.

These last features make it possible to reduce the energy consumption of a belt-type dryer.

For preference, the method further comprises in succession:
- a step of drying the low-temperature air flow after it has been in contact with the pasty products,
- a step of heating the flow of dried air by causing this flow to pass in thermal contact with the condenser of the heat pump, this heating-up step generating a heated-up-air flow,
- a step of reusing the heated-up air flow as a low-temperature air flow.

According to one advantageous feature, for the drying step, the low-temperature air flow is passed through the evaporator of the heat pump.

In one preferred embodiment, the low-temperature drying air is brought to a desired temperature with the heat pump of which the evaporator is used to cool the pasty products that have undergone the low-temperature drying step. Thus, the pasty products leave cooled, which makes them easier to keep without the risk of self-heating. Furthermore, the heat thus extracted, raised in temperature by the heat pump, is used to bring the low-temperature air flow to the desired temperature.

The operation of the heat pump may advantageously be modulated according to fluctuations in the cost of electrical energy. For example, if electricity is free of charge at night and payable in the daytime, the heat pump may be switched on only at night.

It is also possible to use the evaporator of the heat pump for a second step of condensing the water contained in the low-temperature air flow after it has been in contact with the pasty products and has already undergone a first condensation step. Once again, by consuming only the nominal energy absorbed by the heat pump, a dual thermal effect favorable to the method is obtained.

For preference, the power of the heat pump is regulated so as not to exceed a predetermined high temperature threshold for the air leaving the condenser of the heat pump, and the power of the low-temperature drying step is regulated so as not to exceed a low temperature threshold for the evaporator of the heat pump. Thus, the heat pump is kept in a temperature range in which it is efficient.

As already mentioned hereinabove, but in a more particular embodiment, the method advantageously comprises: after the low-temperature drying step, a cooling step in which the pasty products are subjected to a cold air flow within at least one cooling compartment, the cold air flow having a temperature lower than the temperature of the low-temperature air flow, and, for preference, the pasty products are cooled using cold produced at the evaporator of a heat pump of which the condenser is used to heat up at least partially one of the said air flows.

According to one advantageous feature, the cold air is at a temperature in the range from −5 to 30° C., preferably in the range from 5 to 20° C., when it arrives at the pasty products in the at least one cooling compartment.

In another preferred embodiment, the at least one conveyor belt comprises a first and a second conveyor belt, and the pasty products are deposited on the first conveyor belt during the depositing step and are transferred to the second conveyor belt during the moving step, the transfer being performed in a turning-over module. Typically, the pasty products are transferred onto the at least one other conveyor belt when their dryness is higher than around 55%, namely when they are past the plastic phase of their drying.

The low-temperature drying step is preferably performed in a first low-temperature drying compartment before the transfer and in a second low-temperature drying compartment after the transfer.

During the depositing step, the pasty products are deposited preferably in the form of spaghetti onto the at least one conveyor belt.

The invention also relates to a dryer for implementing a method according to one or more features described hereinabove, this dryer comprising:
- an inlet module for supplying an upstream end of a treatment path with pasty products,
- at least one conveyor belt allowing the pasty products to be received at the upstream end of the treatment path and moving them along the treatment path,
- an outlet module allowing the pasty products to be extracted at a downstream end of the treatment path,
- behind the inlet module along the treatment path, at least one high-temperature drying module comprising at least one high-temperature drying compartment and at least one high-temperature circuit, the at least one high-temperature circuit being able to generate a high-temperature air flow within the at least one high-temperature drying compartment,
- between the high-temperature drying module and the outlet module along the treatment path, at least one low-temperature drying module comprising at least one low-temperature drying compartment and at least one low-temperature circuit, the at least one low-temperature circuit being able to generate a low-temperature air flow within the at least one low-temperature drying compartment, the low-temperature air flow having a temperature lower than the high-temperature air flow.

According to one advantageous feature, the dryer further comprises, between the low-temperature drying module and the outlet module along the treatment path, at least one cooling module, the at least one cooling module comprising at least one cooling compartment and at least one cooling circuit, the at least one cooling circuit being able to generate a cold air flow within the at least one cooling compartment, the cold air flow having a temperature lower than the temperature of the low-temperature air flow.

According to another advantageous feature, the dryer further comprises at least one turning-over module able to transfer the pasty products from one conveyor belt to another conveyor belt at a certain stage along the treatment path.

According to yet another advantageous feature, the two conveyor belts are superposed.

The dryer advantageously comprises means of thermal insulation between adjacent compartments.

For preference, the dryer comprises means for keeping at least part of the compartments at a droop of pressure.

In one preferred embodiment, the at least one high-temperature circuit comprises at least one condenser able to condense at least part of the water contained in the flowed air within the at least one high-temperature drying compartment, the at least one condenser acting as a heating means for the low-temperature air flow.

According to one advantageous feature, the low-temperature air flow is heated up by said at least one condenser after having undergone a first heating-up.

According to another advantageous feature, after leaving the low-temperature drying compartment, the low-temperature air flow passes through an evaporator of the heat pump and then for said first heating-up through the condenser of the heat pump.

According to yet another advantageous feature, between the outlet of the low-temperature drying compartment and said evaporator, the low-temperature air flow passes through an exchanger, particularly a water lost exchanger, to partially condense the water contained in the low-temperature air flow.

Thus, the heat pump can have a lower power. As a result, its condenser has a more modest temperature and its efficiency is better.

According to one advantageous feature, the dryer comprises means for cooling the pasty products leaving the low-temperature drying compartment using cold produced by the condenser of a heat pump, particularly the one mentioned above.

The dryer may comprise at least one low-temperature hot-water circuit in which there circulates water for heating the low-temperature air flow.

Advantageously, the water circulating in the at least one low-temperature hot-water circuit is heated by the at least one condenser of the moisture present in the high-temperature air flow leaving the high-temperature drying compartment.

As an alternative, but preferably in combination, the water circulating in the at least one low-temperature hot-water circuit may also be heated by at least one external energy source which may be of residual waste-heat origin.

In general, it is preferable for the at least one low-temperature circuit to comprise:
- means for drying the low-temperature air flow leaving the low-temperature drying compartment,
- a heat pump of which the condenser is set up to heat up the dried low-temperature air flow.

In this case, the evaporator of the heat pump is advantageously set up to dry the low-temperature air flow leaving the low-temperature drying compartment.

As an alternative or in combination, the evaporator of the heat pump may also be set up to produce a cooling air flow for cooling the pasty products leaving the low-temperature drying compartment.

In one embodiment, the dryer comprises an exchanger, such as a water lost exchanger or any other cooling means, for performing an at least primary condensing of the water contained in the air flow leaving the low-temperature drying compartment.

According to another advantageous feature, the cooling circuit and the low-temperature circuit have a part in common.

Included among other advantages of the invention is the fact that the cooling of the sludge is performed by the production of specific cold air, the temperature and flow rate of which can be controlled through the operation of the heat pump. Thus, the temperature of the dried sludge leaving the dryer can be controlled with a view to a cooling that allows this sludge to be stored without the risk of self-heating.

The invention also allows fine control over the thermal parameters of the cooling through accurate control of the temperature and/or the flow rate of the cold air produced by the device, the purpose there being to achieve the target cooling objectives, namely typically to cool the sludge down to a temperature lower than 35° C., advantageously lower than 20° C.

Furthermore, the invention makes it possible to use the heat that is "pumped" to produce the cold in order to supply the dryer with heat.

DESCRIPTION OF THE FIGURES AND EMBODIMENTS

Further advantages and features of the invention will become apparent from reading the detailed description of entirely nonlimiting implementations and embodiments, and from studying the following attached drawings.

Because the embodiments described hereinafter are entirely nonlimiting, it is notably possible to consider alternative forms of the invention that comprise only a selection of the features described, in isolation from the other features described (even if this selection is isolated within a sentence containing these other features) if this selection of features is sufficient to confer a technical advantage or to differentiate the invention from the prior art. This selection comprises at least one feature, preferably functional without structural details, or with just some of the structural details if this part alone is sufficient to confer a technical advantage or to differentiate the invention from the prior art.

In this document:
- a compartment in which air flows at high temperature, of which the temperature is preferably higher than 100° C., and preferably comprised between 100 and 200° C., is referred to as a high-temperature drying compartment;
- a compartment in which air flows at low temperature, of which the temperature is preferably comprised between 20 and 90° C., is referred to as a low-temperature drying compartment;
- a compartment in which cold air flows, the temperature is which is preferably comprised between −5 and 30° C., and preferably between 5 and 20° C., is referred to as a cooling compartment.

Furthermore, the terms "high-temperature air", "low-temperature air" and "cold air" are relative to one another, which means to say that high-temperature air has a temperature higher than the temperature of the low-temperature air, and the low-temperature air has a temperature higher than the temperature of the cold air.

In the terminology employed in this document, a circuit comprises loops forming ducts and connecting elements such as condenser, blower, compartment, etc.

Figure 1:
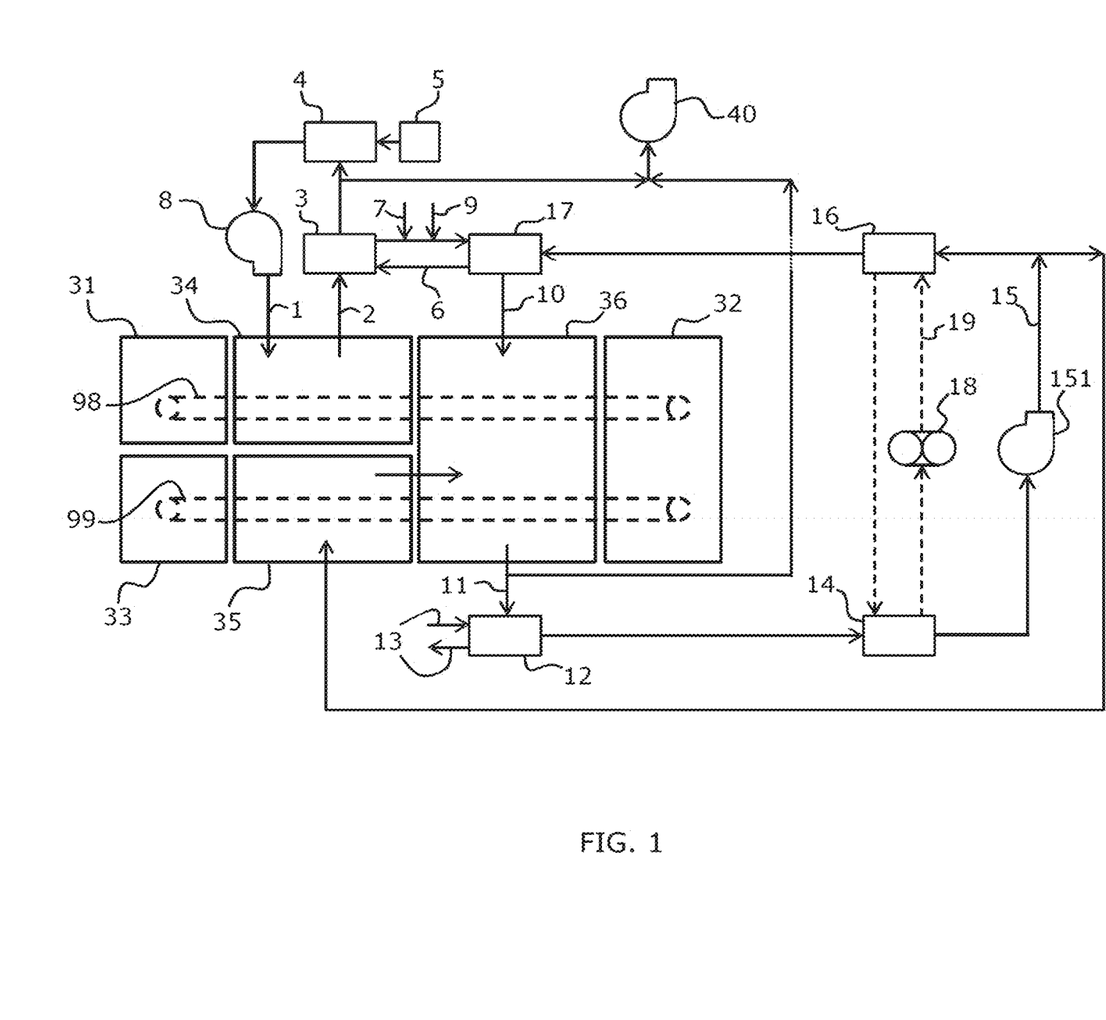
FIG. 1 is a schematic side elevation of a first embodiment of a belt-type dryer and of the aeraulic circuits thereof according to the invention.

FIG. 1 depicts a belt-type dryer comprising an upper belt 98 and a lower belt 99.

This belt-type dryer comprises an inlet module 31 designed to deposit pasty products, notably wastewater sludge, for example having a dryness comprised between 16 and 30%. For example, this module receives dewatered sludge from a storage silo, it converts this sludge into spaghetti form (by extrusion) then deposits it on the upper belt 98 of the belt-type dryer.

The sludge deposited on the upper belt 98 in the inlet module 31 is moved along by the upper belt 98 as far as a turning-over module 32 designed to cause this sludge to pass from the upper belt 98 to the lower belt 99. The sludge that has arrived on the lower belt 99 in the turning-over module 32 is moved by the lower belt 99 as far as an outlet module 33 designed to remove the sludge from the dryer.

In the embodiment depicted in FIG. 1, the belt-type dryer comprises a high-temperature drying compartment 34 adjacent to the inlet module 31. This high-temperature drying compartment performs a high-temperature drying step, namely a step of "searing" the sludge with hot air, in order to prevent the sludge from flowing on the upper belt 98.

The high-temperature drying compartment 34 situated on the upper belt 98 is in this instance superposed with a cooling compartment 35 situated on the lower belt 99. The cooling compartment 35 allows the sludge to be cooled extensively before it is removed by the outlet module 33 to which it is advantageously adjacent. Such cooling allows long-term storage without risk, notably in terms of self-heating.

The high-temperature drying compartment 34 and the cooling compartment 35 are separated by a mechanical and thermal insulation plate.

The belt-type dryer of FIG. 1 also comprises a low-temperature drying compartment 36 situated between, on the one hand, the high-temperature drying 34 and cooling 35 compartments and, on the other hand, the turning-over module 32.

The high-temperature drying 34, low-temperature drying 36 and cooling 35 compartments receive respective air flows via aeraulic circuits and via a heating system all of which are described hereinbelow.

High-Temperature Heating Module

The high-temperature heating module denotes the high-temperature drying compartment 34 and the high-temperature circuit to which it is connected.

The high-temperature circuit is designed to cause hot air to flow in the high-temperature drying compartment 34 via a high-temperature inlet loop 1 of this compartment 34. This hot air is heated by any suitable heating system. In the example of FIG. 1, this heating system comprises a heat source 5 and an exchange system 4 consisting for example of an exchanger using oil, steam or some other hot medium, combustion flue gases (e.g. engine exhaust gases) or even an air-stream burner.

The principle is that of circulating air heated by the heating system 4, 5 in the high-temperature circuit using a blower 8 in order to supply the high-temperature drying compartment 34 via the high-temperature inlet loop 1 with air with a low relative humidity and a temperature preferably higher than 100° and preferably comprised between 100 and 200° C. in order rapidly and to a large extent to vaporize the water contained in the sludge situated on the upper belt 98 in the high-temperature drying compartment 34.

The still-hot air laden with moisture leaving the high-temperature drying compartment 34 via the high-temperature outlet loop 2 is controlled in terms of temperature and humidity so as to have air close to saturation point, typically at 95° C. and 95% humidity (see the "regulation" section below).

The air leaving the high-temperature drying compartment 34 via the high-temperature outlet loop 2 is then de-humidified by condensing the water that it contains in a condenser 3.

The condensers used may be direct condensers (spraying of water into the mist of wastewater, or spraying of water into the mist and cooling of this water using an external water circuit with topping-up of the circulating water) or indirect condensers (water/mist exchangers).

For preference, the belt-type dryer is sized in such a way as to recuperate a water loop 6 at 40-90° C., preferably around 70° C. so as to collect almost all of the heat of condensation with respect to the heat of vaporization of the high-temperature drying module.

The dehumidified air leaves the condenser 3 at a typical temperature of 40-90° C. and is then heated back up by the heating system previously described.

A proportion of the dehumidified air is drawn in by the blower 40 for creating a droop of pressure in the high-temperature drying module and to treat odors.

Low-Temperature Drying Module

The low-temperature drying module denotes the low-temperature drying compartment 36 and the low-temperature circuit to which it is connected.

Cold air circulating in an intermediate loop 15, typically comprised between −10° C. and 30° C., and preferably 10° C., is heated up by a refrigerating fluid 19 in an exchanger 16 to a temperature of 10-60° C., typically 30° C. This air is then heated up in an exchanger 17 by the loop of hot water 6 produced by the condenser 3 to 40-90° C., typically 70° C. This hot and very dry air is made to flow into the low-temperature drying compartment 36 by an inlet low-temperature loop 10 connecting the exchanger 17 to the low-temperature drying compartment 36.

The air extracted from the low-temperature drying compartment 36 by an outlet low-temperature loop 11 is cold and wet. The water that this air contains is then condensed in the water exchanger 12, for example using water lost 13. The water 13 is said to be "lost" because it enters cold and leaves cold or warm without this water necessarily having been put to profitable use. The air thus dried leaves the exchanger 12 at a regulated temperature of 10-40° C., typically 20° C. The regulation consists chiefly in regulating the flow rate of water lost. The dried air is then dried further by the condensing of the water it contains in the "evaporator" part 14 of a heat pump 18 to be cooled to a typical temperature comprised between −10° C. and 30° C., preferably 10° C.

A proportion of the air from the low-temperature circuit is drawn in by the blower 40 in order to keep the low-temperature drying module under negative pressure. In the example depicted in FIG. 1, this blower 40 is connected to the outlet cold-temperature loop 11.

Cooling Module

The cooling module denotes the cooling compartment 35 and the cooling circuit to which it is connected.

In the embodiment of FIG. 1, the cooling circuit is in part common to the low-temperature circuit because the air flowing in the cooling compartment 35 is a proportion of the air coming from the evaporator 14 of the heat pump 18.

Figure 2:
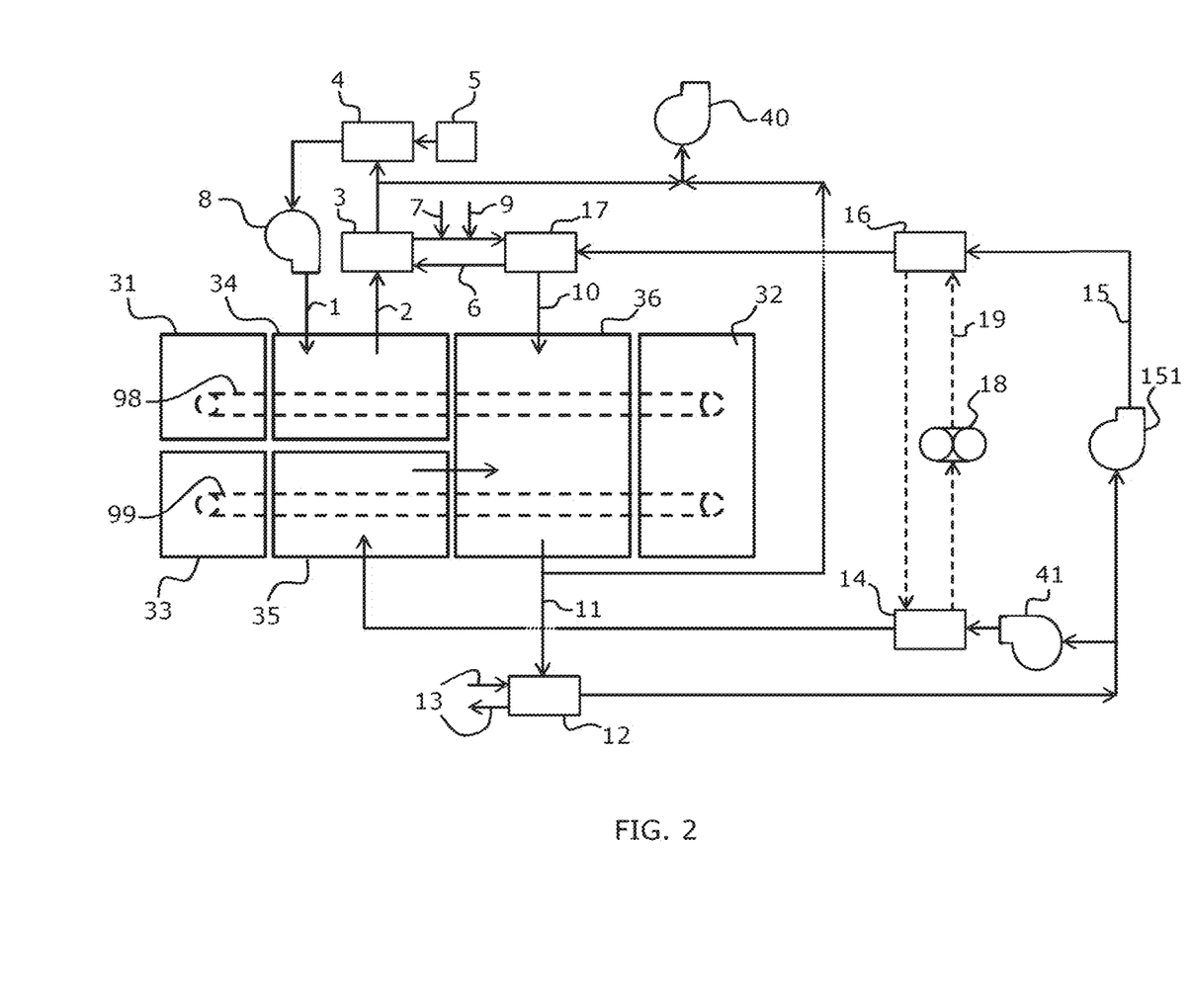
FIG. 2 is a schematic side elevation of a second embodiment of a belt-type dryer and of the aeraulic circuits thereof according to the invention.

In the embodiment of FIG. 2, the cooling circuit is a loop connecting the evaporator 14 of the heat pump 18 and the inlet of the cooling compartment 35.

Heat Pump

In a preferred embodiment, the low-temperature circuit comprises a heat pump 18 able to preheat the air circulating in the low-temperature circuit at the exchanger 16 in which the condenser of the heat pump 18 supplies heat sensitive to the low-temperature air flow. The heat pump 18 also makes it possible to condense the water contained in the air circulating in this circuit at a very low temperature at the evaporator 14 so as to obtain extremely dry air at the low-temperature inlet loop 10 of the low-temperature drying compartment 36. In addition, a proportion of the cold air 15 produced at the evaporator 14 is fed to the cooling compartment 35 via the intermediate loop 15 so as to cool the sludge extensively before it is extracted in the outlet module 33.

The use of the heat pump 18 is not compulsory. It contributes to the good overall efficiency of the belt-type dryer, particularly by creating very dry air in the low-temperature inlet loop 10 which, once heated up, makes it possible to use a low drying flow rate, or alternatively by the creation of very cold air in the intermediate loop 15 which makes it possible to cool the sludge in the cooling compartment 35, and through the use of the heat energy thus extracted to heat one of the flows, particularly the low-temperature flow, very economically.

The cold air injected into the cooling compartment 35 by the intermediate loop 15 is then conveyed to the low-temperature drying compartment 36 by the droop of pressure created by the suction of the circulation blower 151.

In the embodiment in FIG. 2, another blower 41 draws in part of the air leaving the exchanger 12 so as to pass it to the evaporator 14 of the heat pump 18. The other proportion of the air leaving the exchanger 12 and intended to constitute the low-temperature air flow, bypasses the evaporator 14 and goes directly to the condenser 16 of the heat pump. In the same way as described above, the cold and dry air injected into the cooling compartment 35 is then conveyed to the low-temperature drying compartment 36 by the droop of pressure created by the suction of the blower 151.

The invention also relates to such a dryer without a heat pump 18, without a refrigerating fluid 19, without an evaporator 14 and without a condenser 16.

Hydraulic Circuits

There are a number of hydraulic circuits implemented in the alternative forms of the belt-type dryer according to the invention.

In order to control the optimal power of the heat pump 18 before passing on to the condenser 16 of the heat pump 18, the exchanger 12, for example a water lost 13 exchanger, may be fitted.

The hot water loop 6 collects some of the heat from the high-temperature circuit using the condenser 3 and heats the air of the low-temperature circuit. External energy may be supplied to the hot water loop 6 via residual heat 7 and/or, for example, via a boiler 9.

One benefit of the hot water loop 6 is that in the event of it being possible to recuperate residual heat 7 that would otherwise be wasted, the air circulating in the low-temperature circuit can be heated free of charge by the exchanger 17. The operation of the exchanger 12 and of the circuit 13 can thus be controlled in such a way as to allow maximum use of this circuit (see the "regulation" part below).

In the event of there being residual heat known about from the outset, the sizing of the high-temperature drying module is adjusted so that it does not consume excessive amounts of high-quality energy, unless this high-quality energy is also residual energy that would otherwise be wasted.

Such a hot water loop 6 makes it possible to address all the situations regarding residual heat recuperation if these are known from the design stage. Furthermore, it is possible to use greater or lesser amounts of residual heat 7 by means of the possibility for regulation, particularly by performing less drying in the high-temperature drying module.

The belt-type dryer according to the invention may have one or several stages (in FIGS. 1 and 2, there are two stages corresponding to the two belts 98, 99) in order to optimize its specific consumption. For preference, it has two stages.

Creating the Droop of Pressure in the Dryer

As described hereinabove, the dryer is depressurised in order to prevent the spread of odors. This droop of pressure may be created by a single blower 40 using a set of valves (not depicted) to balance the pipe work between the low-temperature circuit passing through the blower 151 and the high-temperature circuit passing through the blower 8, or by using a blower dedicated to creating a droop of pressure on each of the circuits.

Pressure probes (not depicted) can be judiciously sited to provide information relating to the pressure inside the dryer. Such information is important because, on the one hand, in order to avoid the potential escape of odors, the dryer must not find itself at a raised pressure and, on the other hand, in order to avoid potential ingress of air to the dryer, particularly to the inlet module 31, which ingress would significantly alter the thermal balance, the dryer must not find itself at too great a reduced pressure.

Thermal and Aeraulic Insulation

Enhanced thermal insulation is fitted between the high-temperature drying compartment 34 and the cooling compartment 35, at least when the dryer comprises more than one belt, so that the cooling compartment 35 used for cooling the sludge does not get heated up.

Insulation is also fitted between the high-temperature drying compartment 34 and the low-temperature drying compartment 36. The purpose of such insulation is more to prevent excessive circulation of air between these two compartments (cooling of the high-temperature drying compartment 34 or loss of heat from the high-temperature drying compartment 34 by leakage to the low-temperature drying compartment 36). There is no need to have perfect insulation because even if air were to pass from the high-temperature drying compartment 34 to the low-temperature drying compartment 36, this air would contribute to the drying of the sludge.

For preference, the droop of pressure in the low-temperature drying compartment 36 is slightly greater (i.e. pressure lower) than that of the high-temperature drying compartment 34.

Number of Belts

One single belt may be fitted. In that case, no turning-over module 32 is employed and the cooling compartment 35 with its thermal insulation is placed just after one or more low-temperature drying modules.

In the case of several belts, for example three or four belts, the layout principles are comparable: three modules (high-temperature drying, low-temperature drying and cooling) are arranged with air circulating from the cooling compartment to the low-temperature drying compartment, and neutral circulation between the high-temperature drying compartment and the low-temperature drying compartment, with a preference for circulation from the high-temperature drying compartment toward the low-temperature drying compartment.

Air Circulation

For the high-temperature drying, low-temperature or cooling modules, the circulation of air can either and without preference be from the top downward or from the bottom upward.

The air leaving the cooling compartment 35 is directed toward the low-temperature drying compartment 36 in any zone of this compartment. In addition, the air can circulate through the belt either and without preference from the top downward, from the bottom upward, in the direction of travel of the belt or in an opposite direction, and may for example be directed by baffles arranged on each side of the belt in a given compartment.

The circuits, notably the high-temperature or low-temperature circuits, may also comprise air filters arranged in such a way as to make the operations of unclogging or of replacing these filters easier.

Position of Blowers

The positioning of the blowers 8, 40, 151 on their respective air circuit is not restricted to the examples described hereinabove. These blowers need to be able to circulate the air in these circuits and through the exchangers and allow a droop of pressure, possibly an optimized droop of pressure, to be created in the dryer.

The distribution of the air between the high-temperature, low-temperature drying and cooling modules can be achieved by means of deflectors able to split the air across the width of the belt or belts of the dryer.

Furthermore, the high-temperature drying, low-temperature drying and cooling modules may be made up of identical compartments and each comprise one or more circulation blowers to allow regulation of the distribution of the air and one or more exchangers.

Operation Examples

Scenario 1: With No Free-of-Charge Energy and with Heat Pump

In this example, the sludge arrives at the inlet module 31 with the following characteristics: dryness 20%, temperature 20° C., flow rate 2,000 kg/h.

Drying will be performed in the high-temperature drying compartment 34 to a dryness of around 32%, corresponding to a quantity of water evaporated of 750 kg/h. To evaporate this water, the air circuit is made up of at least one blower 8 which blows 16,600 Nm$^3$/h of hot air at 180° C. in at the inlet 1 of the high-temperature drying compartment.

At the outlet 2 of the high-temperature drying compartment 34, the air cools down to a temperature of 100° C. by evaporation of the water contained in the sludge.

In the condenser 3, the loop 6 allows the air from the hot air flow to be cooled to a temperature of 80° C. The water loop reemerges at around 75° C. and has absorbed around 626 kW.

The hot air is then heated up in the exchange system 4 to 180° C., consuming 679 kW via a heat source 5.

The water loop 6 allows the air of the low-temperature circuit to be heated up to a temperature of 70° C. at 10 for a flow rate of around 50,000 Nm$^3$/h.

The air leaving the low-temperature drying compartment 36 at 11 has a temperature of around 38° C. and has allowed all of the water for evaporation that was contained in the sludge to be evaporated in order to reach the desired dryness.

An exchanger 12 supplied with water at 15° C. allows the temperature of the air to be brought down to 20° C., which corresponds to the condensing of a large quantity of the water it contains.

If all of the air is to be made to undergo a further drying by the heat pump (FIG. 1), the latter cools the air down to a temperature of 10° C. and then heats the air back up to a temperature of around 32° C. Around 5,000 Nm$^3$/h of air is drawn up at 15 to be injected into the cooling compartment 35, and allows the sludge to be cooled to a temperature of around 20° C.

In this first scenario, the electricity consumption of the heat pump is around 70 kWe. As the total quantity of water evaporated is 1.56 TWE (metric tonnes of water evaporated) per hour, a thermal consumption of 440 kWhth/TWE is obtained.

Scenario 2: With No Free-of-Charge Energy and without Heat Pump

Without a heat pump, the drying of the first stage will be pursued to 35% dryness, giving an increased consumption of the first stage of around 770 kW. This allows a greater recuperation of energy in the second stage because it is no longer heated up to 32° C. by the heat pump but remains at 20° C.

In this second scenario, the overall thermal consumption is around 500 kWh/TWE for an electricity consumption of 0 (no heat pump).

Scenario 3: With Free-of-Charge Energy and with Heat Pump

Let us consider the scenario of energy free of charge from a cogeneration engine able to supply 300 kWhth/TWE, namely in our case, 468 kWth.

The best system balance then lies at a first-stage outlet dryness of 26%, requiring a consumption of just 432 kWhth in this first stage.

The condensing in the condenser 3 and the addition of residual energy 7 to the water loop 6 makes it possible to provide for the need for air via the exchanger 17 if a heat pump is installed.

In this third scenario, the electricity consumption of the heat pump is 100 kWe in this case, giving a thermal consumption of 280 kWh/TWE and 63 kWhe/TWE.

Regulation

The dryer is sized on the basis of a sludge dryness in the inlet module 31, a sludge dryness at the outlet of the high-temperature drying compartment 34, and a sludge dryness in the outlet module 33 so that the energy produced in the condenser 3 is just enough to power the low-temperature circuit at 17.

Specifically, the optimum for the thermal consumption of the dryer lies at the point at which there is no longer any need to supply external energy 9 in order to dry the sludge sufficiently in the low-temperature drying compartment. The regulation set in place makes it possible always to operate around this optimum while at the same time keeping control over the final dryness of the sludge before it is extracted from the dryer by the outlet module 33, this being on the basis of changes to the inlet dryness and flow rate of the sludge entering the inlet module 31.

For example a signal pertaining to the energy consumption at 9 is given to the dryer, this signal having the effect of increasing within a certain range the setpoint temperature for the air leaving the exchange system 4 so as to increase the drying in the high-temperature drying module 34.

An in-line dryness measurer measuring the dryness of the sludge at the outlet module 33 makes it possible to adapt the drying conditions needed in the low-temperature inlet loop 10 of the low-temperature drying compartment 36 and, therefore, accordingly, the demand for energy at 9.

In particular, the setpoint temperature in the low-temperature inlet loop 10, or the temperature or humidity setpoint in the low-temperature outlet loop 11 may be established as a function of the dryness of the sludge in the outlet module 33. These setpoints may be controlled by the boiler 9 or any other top-up energy system that will supply greater or lesser amounts of energy.

In the event of no additional energy 9 being required, the facility self regulates. If the water in the loop 6 becomes too hot, for example because the need for drying of the low-temperature drying module is low (dryness too high) and because the air flow rate in the intermediate loop 15 has decreased, condensing in the condenser 3 does not work as well and the need for heating-up of the exchange system 4 is lower, automatically reducing the dryness at the outlet from the high-temperature drying compartment 34.

If the temperature of the water in the loop 6 increases too sharply, for example reaching a state close to vaporization, or if the temperature at the inlet to the exchange system 4 is too high, for example higher than 100° C., the temperature setpoint at the outlet of the exchange system 4 using the external energy 5 is automatically made to decrease.

Furthermore, the temperature at the condenser 16 of the heat pump 18 can be measured for example on the air flow leaving the condenser or at the outlet of the condenser for the refrigerant.

Specifically, the smaller the temperature difference between the evaporator 14 and the condenser 16 of the heat pump 18, the more efficient a heat pump is. Hence, for system efficiency, it is best to limit the high temperature of the heat pump or else risk the need to supplement the heating by some other means. This means that the cold power available at the evaporator of the heat pump is limited. If the temperature at the evaporator of the heat pump increases that means that the cold power is not enough to condense what remains of the moisture in the air and to produce the cooling air. Because the power needed for the cooling air is not something that can be controlled directly, the flow rate of the water lost 13 has then to be increased in order to increase the drying in the first condensation step.

Control of the Heat Pump

The heat pump 18 collects heat in order to achieve a cold air temperature given setpoint (on all or part of the stream). This setpoint may come from a measurement of the temperature of the sludge in the outlet module 33.

The heating-up in the condenser 16 of the heat pump 18 is not controlled but is a result of the operation of the heat pump 18.

Condensation in the exchanger 12 is performed in a controlled manner so as to have a condensation outlet setpoint temperature that is dependent on the operator in order to have dryer air that will allow for better drying. It may also be possible to adopt a temperature dependent on the desired temperature for the air leaving the heat pump 18.

Other forms of regulation such as regulating the speed at which a belt moves may be set in place, particularly when the dryer has several stages.

The dryer according to the present invention, comprising several distinct heat loops, may have multiple parameters for modifying and controlling the final dryness while at the same time consuming a minimum amount of energy.

Of course, the invention is not restricted to the examples that have just been described and numerous variations can be made to these examples without departing from the scope of the invention. In addition, the various features, forms, embodiments and alternative forms of embodiment of the invention may be combined with one another in various combinations in so far as they are not mutually incompatible or mutually exclusive.

The invention claimed is:

1. A dryer, comprising:
an inlet module (31) for supplying an upstream end of a treatment path with pasty products;
at least one conveyor belt (98, 99) allowing the pasty products to be received at the upstream end of the treatment path and moving them along the treatment path;
an outlet module (33) allowing the pasty products to be extracted at a downstream end of the treatment path;
behind the inlet module (31) along the treatment path, at least one high-temperature drying module comprising at least one high-temperature drying compartment (34) and at least one high-temperature circuit, the at least one high-temperature circuit being able to generate a high-temperature air flow (1) within the at least one high-temperature drying compartment (34);
between the high-temperature drying module and the outlet module along the treatment path, at least one low-temperature drying module comprising at least one low-temperature drying compartment (36) and at least one low-temperature circuit, the at least one low-temperature circuit being able to generate a low-temperature air flow within the at least one low-temperature drying compartment (36), the low-temperature air flow having a temperature lower than the high-temperature air flow (1);
means for cooling the pasty products leaving the low-temperature drying compartment (36) using cold produced by an evaporator (14) of a heat pump (18); and
at least one low-temperature hot-water circuit (6) in which there circulates water for heating the low-temperature air flow,
wherein the water circulating in the at least one low-temperature hot-water circuit (6) is heated by at least one condenser (3).

2. The dryer as claimed in claim 1, further comprising:
between the low-temperature drying module and the outlet module (33) along the treatment path, at least one cooling module, the at least one cooling module comprising at least one cooling compartment (35) and at least one cooling circuit, the at least one cooling circuit being able to generate a cold air flow (15) within the at least one cooling compartment, the cold air flow (15) having a temperature lower than the temperature of the low-temperature air flow.

3. The dryer as claimed in claim 1, further comprising:
at least one turning-over module (32) able to transfer the pasty products from one conveyor belt (98) to another conveyor belt (99) at a certain stage along the treatment path.

4. The dryer as claimed in claim 1, wherein the at least one condenser (3) is configured to condense at least part of the water contained in air flowed through the at least one high temperature drying compartment (34), the at least one condenser (3) acting as a heating means for the low temperature air flow.

5. The dryer as claimed in claim 4, wherein the low-temperature air flow is heated up by said at least one condenser (3) after having undergone a first heating-up.

6. The dryer as claimed in claim 5, wherein, after leaving the low-temperature drying compartment (36), the low-temperature air flow passes through the evaporator (14) of the heat pump (18) and then, for said first heating-up, through a condenser (16) of the heat pump (18).

7. The dryer as claimed in claim 6, wherein, between an outlet of the low-temperature drying compartment (36) and said evaporator (14), the low-temperature air flow passes through an exchanger (12) to partially condense the water contained in the low-temperature air flow.

8. The dryer as claimed in claim 1, wherein the water circulating in the at least one low-temperature hot-water circuit (6) is heated by at least one external energy source (7, 9).

9. The dryer as claimed in claim 1,
wherein the at least one low-temperature circuit comprises:
means for drying the low-temperature air flow leaving the low-temperature drying compartment (36) and said heat pump (18), said condenser (16) configured to heat the dried low-temperature air flow,
and wherein the evaporator (14) of the heat pump (18) is configured to dry the low-temperature air flow leaving the low-temperature drying compartment (36).

10. The dryer as claimed in claim 9,
wherein the evaporator (14) of the heat pump (18) is configured to produce a cooling air flow for cooling the pasty products leaving the low-temperature drying compartment (36), and
wherein the dryer further comprises an exchanger (12) for performing an at least primary condensing of the water contained in the air flow leaving the low-temperature drying compartment (36).

11. The dryer as claimed in claim 2, wherein the cooling circuit and the low-temperature circuit have a common area.

* * * * *